Dec. 18, 1951  T. W. ROBERG  2,579,128
POULTRY CRATE CLOSURE
Filed Sept. 6, 1949
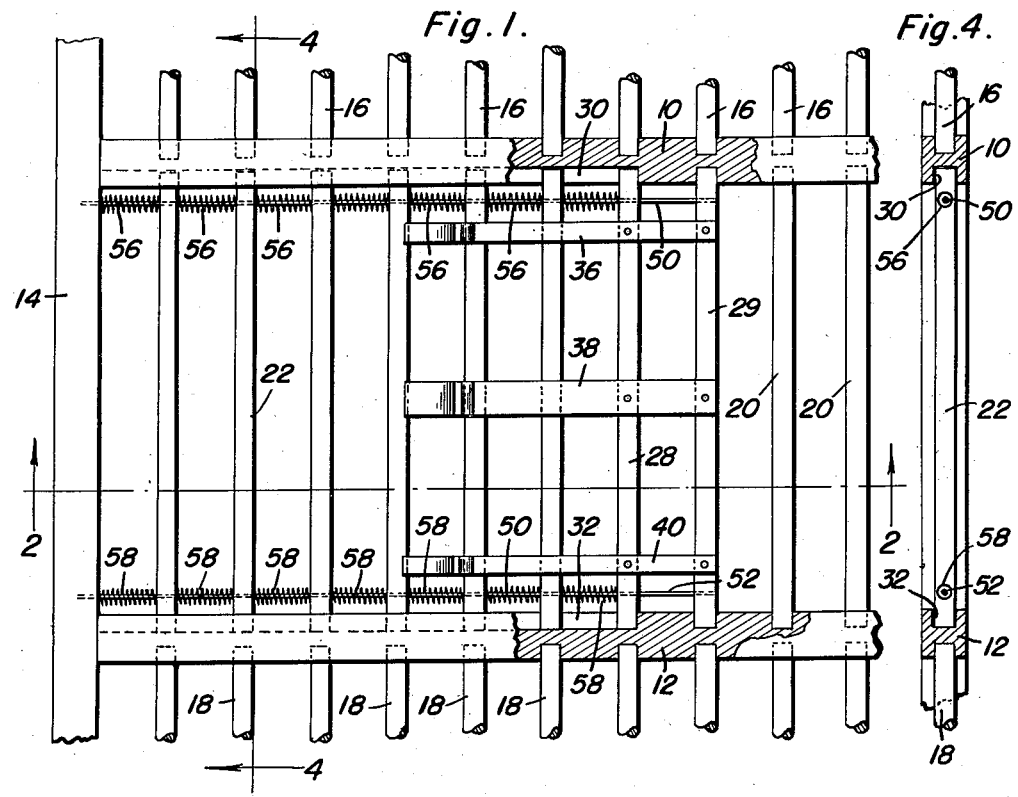
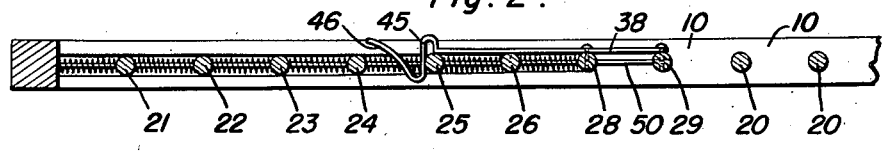
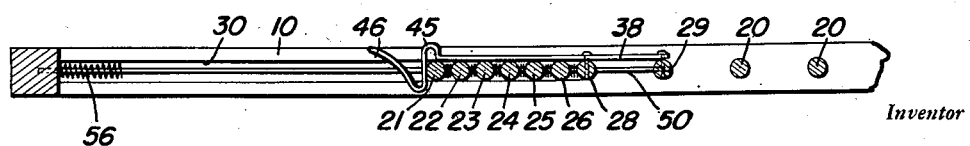
Inventor
Theodore W. Roberg
By Clarence A. O'Brien
and Harvey B. Jacobson
Attorneys Patented Dec. 18, 1951

2,579,128

UNITED STATES PATENT OFFICE 2,579,128

POULTRY CRATE CLOSURE

Theodore W. Roberg, Storrs, Conn.

Application September 6, 1949, Serial No. 114,095

2 Claims. (Cl. 160—172)

This invention relates to novel and useful improvements in poultry crates.

An object of this invention is to form a poultry crate in such a manner that certain rungs thereof are adapted to slide in channels against the opposing force of springs so as to form an opening for the entrance and removal of fowl from the crate.

Another object of this invention is to form an improved closure in a poultry crate through the utility of a number of rungs which are so disposed as to be capable of being squeezed together against the opposition of a plurality of springs and after they are squeezed together, retained in a suitable clip whereby they are held in the open position; the opposition of the springs being such as to return the moved rungs after they are removed from the clip.

Ancillary objects and features of novelty will become apparent to those skilled in the art, in following the description of the preferred form of the invention, illustrated in the accompanying drawings, wherein:

Figure 1 is a fragmentary portion of a conventional poultry crate having the improvement of the invention therein;

Figure 2 is a sectional view taken substantially on the line 2—2 of Figure 1 and in the direction of the arrows;

Figure 3 is a sectional view somewhat similar to Figure 2 but showing the rungs which form the closure and the entrance and removal opening forming positions; and Figure 4 is a sectional view taken substantially on the line 4—4 of Figure 2 and in the direction of the arrows.

The present invention deals with closures for poultry crates or other types of crates or boxes which utilize rungs, slots or similar articles for sides or the top, or the bottom or any part of the sides, top or bottom. Reference to Figure 1 shows a fragmentary portion of a crate typical of those used in connection with retaining poultry. A support or frame member 10 and a support or frame member 12 is shown with an end post 14 secured thereto. Rungs 16 are secured in suitable apertures provided in the frame member 10 and rungs 18 are provided in similar apertures in the member 12. The members 10 and 12 together with the rungs 16 and 18 form a part of a top for a poultry crate.

The top rungs 20 are absolutely conventional in nature. However, the rungs 21, 22, 23, 24, 25, 26 and the rung 28 are disposed in a passageway 30 formed by a laterally directed channel in the member 10. An identical passageway 32 is formed by a similar channel in the member 12. The ends of the rungs 21 through 28 inclusive are disposed in the passageways 30 and 32 so as to be laterally displaceable therein.

The rung 29 which is disposed between the initial rung 20 and the rung 28 is fixed in an aperture formed in the member 10 and also in an aligned aperture formed in the member 12, similar to the rung 20. Accordingly, the rung 29 is stationary.

Clips formed of resilient material such as spring metal are indicated at 36, 38 and 40 respectively. The flanking clips 36 and 40 are narrower than the central clip 38. The means for fastening the clips 36, 38 and 40 in place may be simple rivets, screws or the like, there being at least two provided for each clip, one being anchored in the rung 29 while the other is anchored in the rung 28.

At the ends of each clip (see Figures 2 and 3) there is a hook 45 formed integral therewith with a finger grip 46 extending therefrom. The hook is so shaped as to be disposed between a pair of movable rungs when the clip is in its normal position.

A guide 50 which may be in the form of a dowel is secured to the rung 29 and also to the end member 14. An identical guide 52 is also secured to the end member 14 and the rung 29. Suitable apertures are provided in the movable rungs 21–26 inclusive so that the guides 50 and 52 may be passed therethrough.

Disposed in concentric relationship with each guide 50 is a group of springs, the upper group of springs being indicated at 56 while the lower group of springs are indicated at 58. Inspection of Figure 1 discloses clearly that there is one spring provided between each rung 21, 22, 23, 24, 25, 26 and 28 for the series of springs indicated at 56 and a similar number, similarly situated in connection with the series of springs, each of which are indicated at 58.

In operation it is necessary only to pull one of the rungs or rods that is disposed in the channels or passageways 30 and 32, toward the clips 36, 38 and 40. The springs are then compressed, urging all of the other rungs or rods which are disposed therebehind, behind the said clips. Accordingly, the necessary opening for entry and removal of fowl or other things such as articles, is provided. The last rung pulled toward the clips is disposed therebehind as disclosed in Figure 3 and it is only necessary to lift the clips thereby permitting the springs to expand and push the rungs or rods to the position necessary for preventing the contents of the crate from being removed.

Having described the invention, what is claimed as new is:

1. A closure comprising a panel including a pair of spaced, parallel bars defining two walls of an access opening and having opposed, longitudinal grooves therein, guide rods traversing the opening adjacent the bars and parallel therewith, rungs slidable in opposite directions on the guide rods and having their end portions slidably engaged in the grooves for mounting said rungs on the bars, said rungs constituting a closure for the opening, and coil springs on the guide rods between the rungs and engaged therewith for yieldingly resisting sliding movement of said rungs in opposite directions.

2. The construction defined in claim 1, together with a plurality of elongated, resilient hooks mounted on the panel and extending over the opening, certain of the rungs being selectively engageable with the hooks for releasably securing said certain rungs in open position.

THEODORE W. ROBERG.

REFERENCES CITED

The following references are of record in the file of this patent:

UNITED STATES PATENTS

| Number | Name | Date |
|---|---|---|
| 305,368 | Armstrong | Sept. 16, 1884 |
| 1,039,113 | Fowler | Sept. 24, 1912 |
| 1,187,809 | Browne | June 20, 1916 |